(12) United States Patent
Riepold

(10) Patent No.: US 9,988,071 B2
(45) Date of Patent: Jun. 5, 2018

(54) ANGULARLY MOVABLE BEARING ARRANGEMENT FOR PINIONS IN REDUCTION GEARS OF ELECTROMECHANICAL STEERING SYSTEMS

(71) Applicant: THYSSENKRUPP PRESTA AG, Eschen (LI)

(72) Inventor: Thomas Riepold, Widnau (CH)

(73) Assignee: THYSSENKRUPP PRESTA AG, Eschen (LI)

( * ) Notice: Subject to any disclaimer, the term of this patent is extended or adjusted under 35 U.S.C. 154(b) by 225 days.

(21) Appl. No.: 14/772,521

(22) PCT Filed: Feb. 21, 2014

(86) PCT No.: PCT/EP2014/053393
§ 371 (c)(1),
(2) Date: Sep. 3, 2015

(87) PCT Pub. No.: WO2014/135382
PCT Pub. Date: Sep. 12, 2014

(65) Prior Publication Data
US 2016/0031473 A1    Feb. 4, 2016

(30) Foreign Application Priority Data

Mar. 6, 2013 (DE) .................... 10 2013 003 749

(51) Int. Cl.
*F16H 55/24* (2006.01)
*B62D 3/10* (2006.01)
(Continued)

(52) U.S. Cl.
CPC ............. *B62D 3/10* (2013.01); *B62D 5/0409* (2013.01); *B62D 5/0421* (2013.01);
(Continued)

(58) Field of Classification Search
CPC .... F16C 23/082; F16C 23/088; F16C 35/077; B62D 3/10; B62D 5/0409; B62D 5/0421; F16H 55/24
(Continued)

(56) References Cited

U.S. PATENT DOCUMENTS 558,642 A * 4/1896 Fayol
4,240,677 A 12/1980 Payne
(Continued)

FOREIGN PATENT DOCUMENTS

DE    102006010825 A1    9/2007
DE    102008040673 A1    1/2010
(Continued)

OTHER PUBLICATIONS

English machine translation of JPH0572963U.
(Continued)

*Primary Examiner* — William C Joyce
(74) *Attorney, Agent, or Firm* — thyssenkrupp North America, Inc.

(57) ABSTRACT

A bearing arrangement for a motor vehicle steering system includes a sleeve arranged between an outer bearing ring and a housing. The sleeve includes an inner contact surface in contact with an outer circumferential surface of the outer bearing ring, and an outer contact surface in contact with a seat surface of the housing, wherein either of the inner contact surface or the outer contact surface of the sleeve are convex shaped.

20 Claims, 3 Drawing Sheets

(51) Int. Cl.
*B62D 5/04* (2006.01)
*F16C 35/077* (2006.01)
*F16C 19/06* (2006.01)

(52) U.S. Cl.
CPC ........... *F16C 35/077* (2013.01); *F16H 55/24* (2013.01); *F16C 19/06* (2013.01); *F16C 2326/24* (2013.01)

(58) Field of Classification Search
USPC .................................................. 74/409, 425
See application file for complete search history.

(56) References Cited

U.S. PATENT DOCUMENTS

| | | | |
|---|---|---|---|
| 8,539,849 B2 * | 9/2013 | Bernhard | B62D 5/0409 384/498 |
| 2007/0209345 A1 | 9/2007 | Schumacher | |
| 2010/0247017 A1 | 9/2010 | Mola et al. | |
| 2011/0017542 A1 | 1/2011 | Kim | |
| 2012/0111657 A1 | 5/2012 | Hamakita | |
| 2012/0125132 A1 | 5/2012 | Bernhard et al. | |
| 2013/0206497 A1 | 8/2013 | Fuechsel et al. | |

FOREIGN PATENT DOCUMENTS

| | | |
|---|---|---|
| DE | 102008042609 A1 | 4/2010 |
| DE | 102008056024 A1 | 5/2010 |
| DE | 102008054441 A1 | 6/2010 |
| DE | 102009018674 A1 | 10/2010 |
| DE | 102009002940 A1 | 11/2010 |
| DE | 102010002285 A1 | 8/2011 |
| DE | 10 2010 003 727 * | 10/2011 |
| DE | 102012005931 | 9/2013 |
| EP | 1452419 A1 | 9/2004 |
| EP | 1571067 A1 | 9/2005 |
| EP | 2450262 A1 | 5/2012 |
| FR | 2911171 A | 7/2008 |
| JP | H0572963 U | 3/1993 |
| JP | H0735147 A | 2/1995 |

OTHER PUBLICATIONS

English abstract of FR2911171A.
German language International Search Report for International patent application No. PCT/EP2014/053393; dated May 13, 2014.
English translation of International Search Report for International patent application No. PCT/EP2014/053393; dated May 13, 2014.
German Office Action for Priority German Patent Application No. DE 102013003749.2.
English translation of abstract for DE 102008054441 A1.
English translation of abstract for DE 102008042609 A1.
English translation of abstract for JP H0735147 A.
English translation of abstract for DE 102009018674 A1.
English translation of abstract for DE 102008040673 A1.
English translation of abstract for DE 102008056024 A1.
English translation of abstract for DE 102012005931 A1.

* cited by examiner

ANGULARLY MOVABLE BEARING ARRANGEMENT FOR PINIONS IN REDUCTION GEARS OF ELECTROMECHANICAL STEERING SYSTEMS

CROSS REFERENCE TO RELATED APPLICATIONS

This application is a U.S. National Stage Entry of International Patent Application Serial Number PCT/EP2014/053393, filed Feb. 21, 2014, which claims priority to German patent application no. DE 102013003749.2 filed Mar. 6, 2013, the entire contents of both of which are incorporated herein by reference.

FIELD

The present invention relates to a helical gear mechanism.

BACKGROUND

To improve driving comfort, electromechanical steering systems of motor vehicles have power steering systems which introduce the assistance force generated by an electric motor into the steering column or the steering pinion and thus boost the force imparted by the driver when steering. In this case, the assistance force of the electric motor is transmitted to the steering pinion by means of a reduction gear mechanism, which may be in the form of a helical gear mechanism, worm gear mechanism or globoid gear mechanism.

The steering system-specific requirements demand that the reduction gear mechanism operates quietly without rattling and knocking and, in combination therewith, exhibits low friction. For this purpose, the tooth flank clearance of the reduction gear mechanism is minimized or eliminated.

A multiplicity of methods for minimizing the tooth flank clearance is known from the prior art.

To eliminate the clearance of the toothing engagement and at the same time permit a radial movement of the pinion, it is possible for the clearance to be set or readjusted for example by displacement of the pinion radially with respect to the gearwheel by means of one or more eccentrics. Furthermore, methods exist in which the pinion and the gearwheel are preloaded elastically against one another by way of suitable elastic elements. These methods permit compensation of concentricity tolerances of pinion and gearwheel, thermal expansion and wear.

In this case, the pinion axis is pivoted out of its central position, wherein the rear bearing arrangement itself, facing toward the motor, tilts. If the tilting of the bearing exceeds a threshold which is dependent on the bearing type and the bearing clearance, this leads to increased friction, severe fluctuations in friction, noises and a reduced service life of the bearing arrangement.

If it is assumed that the axial clearance of the bearings must be minimized in order to reduce steering knocking and rattling noises, the bearing types necessitated by this, such as for example four-point bearings, are even more sensitive to tilting.

It is therefore desirable, in particular also in the case of reduced axial clearance of the bearing, to permit tilting of the bearing without the abovementioned disadvantages.

Arrangements are known from the prior art for this purpose, which arrangements will be described below.

EP 2450262 A1 has disclosed a solution for the preloading of a worm gear mechanism, in which the bearing shells of the rolling bearing are designed such that the rolling bodies in the bearing shells permit an angular movement.

In the laid-open specification DE 10201002285 A1, the mounting of a helical pinion at a fixed bearing side is realized by way of a rolling bearing which permits a small pivot angle. Said pivoting is made possible by virtue of the outer bearing shell being received in a spherical cap-shaped bearing receptacle.

Furthermore, in DE 102008054441 A1, a solution is disclosed in which a convex outer bearing ring interacts with a resilient ring which permits elastic pivoting of the outer bearing ring. The bearing receptacle is in this case partially of concave form.

The patent application DE 102012005931, which does not constitute a previously published document, relates to a bearing which is damped in an axial direction. The bearing is received in a housing which has a projection of crowned form, whereby the bearing can perform a pendular movement.

It is an object of the present invention to provide a helical gear mechanism which has a bearing arrangement with improved characteristics.

BRIEF DESCRIPTION OF THE DRAWINGS

The present disclosure is described in detail below with reference to the attached drawing figures, wherein.

DETAILED DESCRIPTION

Figure 1:
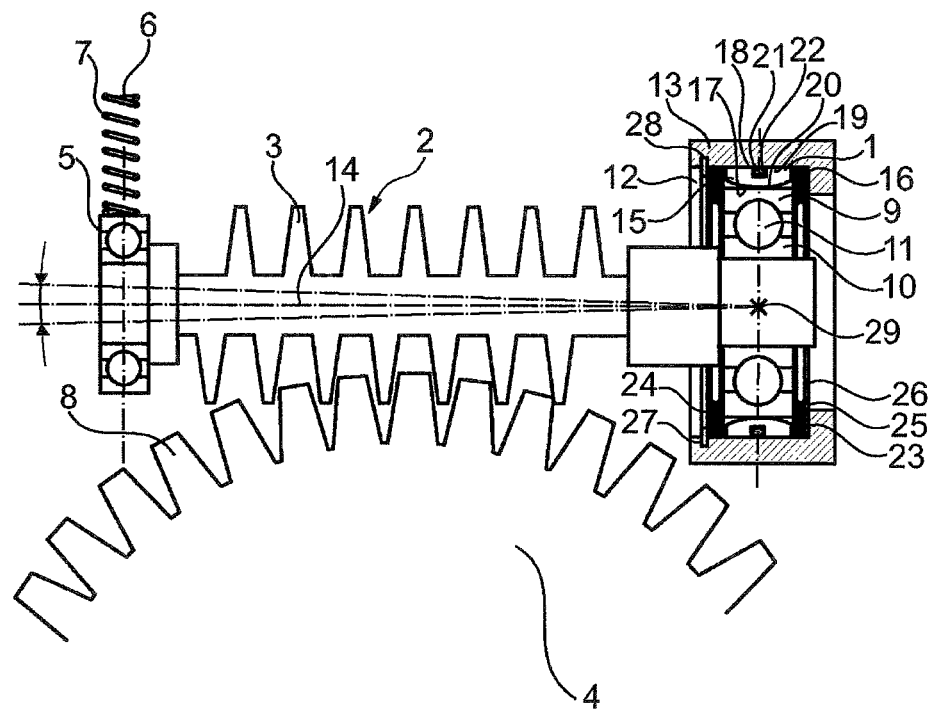
FIG. 1 is a partial side cross section view of a schematic embodiment of a helical gear mechanism for a power steering system, as disclosed herein.

Disclosed herein is a helical gear mechanism for a steering system of a motor vehicle, having a helical gear and having a helical pinion which engages into a toothing of the helical gear, having a fixed bearing which has a bearing inner ring arranged fixedly on a bearing seat on the helical pinion and which has a bearing outer ring and by means of which the helical pinion is mounted, at a drive input side, so as to be rotatable about a longitudinal axis, wherein the fixed bearing is received in a housing, and the helical pinion together with the fixed bearing is pivotable relative to the housing about a pivot axis oriented perpendicular to the longitudinal axis, wherein, between the bearing outer ring and the housing, there is arranged a sleeve, wherein the sleeve has an inner contact surface which is in contact with an outer circumferential surface of the bearing outer ring, and has an outer contact surface which is in contact with a seat surface of the housing, wherein either the inner contact surface or the outer contact surface is of convex form and both the circumferential surface and the seat surface are of cylindrical form. In this case, the helical gear mechanism may be in the form of a worm gear mechanism or globoid gear mechanism.

The bearing outer ring and the sleeve form an angularly movable joint, whereby the bearing is mounted so as to be movable relative to the housing.

A purely cylindrical form of the circumferential surface and of the seat surface is particularly preferred.

It is furthermore advantageous if the sleeve is of elastic form, such that an effective diameter enlargement arising owing to the oblique position of the bearing outer ring in the sleeve can be compensated.

It is preferable if the convex contact surface of the sleeve is in linear contact with the circumferential surface or with the seat surface. Depending on the embodiment, the inner contact surface or the outer contact surface is of crowned form. Correspondingly, either the circumferential surface or the seat surface is in linear contact with the convex contact surface. In this case, the linear contact preferably lies on the central plane of the fixed bearing.

It is furthermore advantageous if the pivot axis extends centrally through the fixed bearing and thus likewise lies in the central plane of the fixed bearing, such that the pivoting acting on the rolling bearing, and the resulting moments, can be largely compensated by way of the joint sleeve which is of crowned form at the inside or the outside.

It is furthermore advantageously provided that the helical pinion is, at the fixed bearing, connected to the drive motor by means of an elastic coupling, which permits the pivoting of the helical pinion without the motor being moved conjointly.

It is preferably provided that a cylindrical contact surface facing the convex contact surface of the sleeve has a central recess, which is provided for receiving an annular preload element, wherein the characteristic curve of the preload element is advantageously progressive.

Furthermore, in a preferred embodiment, the sleeve has expansion slots extending through it radially.

It is advantageously provided that the expansion slots are arranged offset on both sides of the sleeve and extend beyond a central axis.

In another preferred embodiment of the bearing arrangement according to the invention, the recess on the cylindrical contact surface is of concave form, wherein no radial preload element is provided. In this case, the radial spring characteristic curve is determined by the geometry of the recess. In this embodiment, the expansion slots are likewise arranged offset on both sides of the sleeve.

In preferred embodiments, it is provided that the fixed bearing is held axially by at least one axial spring element which has a ring situated close to the bearing and which permits tilting of the bearing. The axial spring element situated close to the helical pinion is in this case secured axially by a securing ring in a groove in the housing.

In a preferred embodiment of the axial spring elements, the rings, situated in each case close to the bearing, of the axial spring elements have at least one convex protuberance, the centers of which protuberances define an axis of rotation which coincides with the pivot axis of the helical pinion. This arrangement further reduces the tilting moments still acting on the bearing.

Here, it is advantageous if the housing has, on the inner side, a groove into which there engages in each case one alignment lug of the rings, situated close to the bearing, for alignment of the convex protuberance. This refinement according to the invention makes it easier to realize the correct alignment of the convex protuberances during the assembly process.

The above-described embodiments according to the invention of the helical gear mechanism are preferably used in an electric power steering system for motor vehicles.

The present disclosure will be discussed in further detail below with reference to the attached drawing figures.

FIG. 1 shows an illustration of a power steering system of a steering unit (not illustrated in any more detail) with a bearing arrangement, according to the invention, of a rolling bearing 1. Via a coupling of a drive shaft to a helical gear mechanism 2 composed of a helical pinion 3 and a helical gear 4, an electric motor (not illustrated here) drives a steering column (not shown here). In the embodiment according to the invention shown here, the helical gear mechanism is in the form of a worm gear mechanism. The helical pinion 3 is mounted at the fixed bearing side by way of the rolling bearing 1 according to the invention. The other end of the helical pinion 3 is mounted in a floating bearing 5 which, in the exemplary embodiment, is likewise realized by way of a rolling bearing. The helical pinion 3 is pressed with a certain force by way of the floating bearing 5 into the toothing 8 of the helical gear 4 by way of a preload device 6 which has a compression spring 7.

The rolling bearing 1 at the fixed bearing side, said rolling bearing having a bearing outer ring 9 and a bearing inner ring 10 and a multiplicity of rolling bodies 11, is received in a housing opening 12 of a housing 13. Said housing opening 12 is of cylindrical form about an axis of rotation 14 of the helical pinion 3, wherein the radius on the side close to the helical gear mechanism has been selected to be of such a magnitude that a sleeve 15 can be received between the bearing outer ring 9 of the rolling bearing 1 and the housing 13. Toward the drive input side, the radius of the housing opening 12 decreases, forming a housing shoulder 16.

An inner contact surface 17 of the received sleeve 15 is of crowned form, and an outer contact surface 18 of the sleeve 15 is of cylindrical form. The width of the sleeve 15 corresponds approximately to the width of the rolling bearing 1. The sleeve 15 bears by way of the outer contact surface 18 against a seat surface 19 of the housing 13 and by way of the inner contact surface 17 against an outer circumferential surface 20 of the bearing outer ring 9, wherein the contact between the crowned form of the sleeve 15 and the bearing 1 is linear. The cylindrical outer contact surface 18 has a rectangular recess 21 in which an annular elastomer preload element 22 is received. For the axial fastening of the bearing, axial spring elements 23, 24 are provided on the side close to the helical gear mechanism and on the side remote from the helical gear mechanism, between the bearing outer ring 9 and the housing shoulder 16. Said axial spring elements 23, 24 are composed of elastomers 25, which are each arranged between two rings 26 and which have been applied to said rings by vulcanization. The outer diameter of the rings 26 corresponds in this case, with a certain clearance, to the diameter of the housing opening 12. The inner axial spring element 23 bears against the housing shoulder 16, and the outer axial spring element 24 is held in its position by a securing ring 28 inserted into a groove 27 in the housing 13. The axial spring elements 23, 24 are advantageously in the form of two elastomer elements which are preloaded against one another and which have a progressive spring characteristic curve.

The helical pinion 3 is mounted in the fixed bearing 1 so as to be pivotable perpendicularly with respect to the axis of rotation 14, wherein the pivot axis 29 extends centrally through the fixed bearing 1. In this way, the toothing clearance can be kept constant over the entire service life of the gear mechanism by way of the preload device 6.

The pivoting movement of the helical pinion 3 and the preload of the floating bearing 5 are indicated by arrows.

Figure 2:
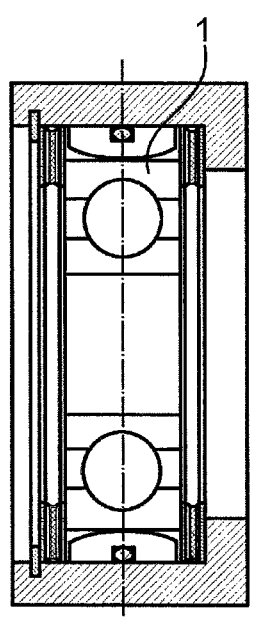
FIG. 2 is a side cross section view of an embodiment of a bearing assembly of the present disclosure.

FIG. 2 is an enlarged illustration of the bearing arrangement, according to the invention, of the rolling bearing 1 from FIG. 1.

Figure 3:
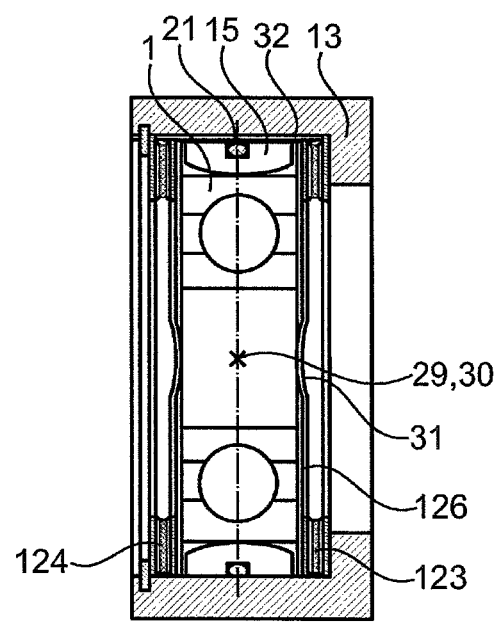
FIG. 3 is a side cross section view of an alternate embodiment of a bearing assembly of the present disclosure.

FIG. 3 illustrates a second embodiment of the bearing arrangement. In this case, two axial spring elements 123, 124 are designed such that an axis of rotation 30 is defined which corresponds to the position of the pivot axis 29. For this purpose, two rolling bearing-side rings 126 of the axial spring elements 123, 124 each have two convex protuberances 31 in the direction of the rolling bearing 1. This arrangement further reduces the tilting moments acting on the rolling bearing 1.

The correct position of the axial spring elements 123, 124 during the assembly process is ensured by means of a groove 32 in the housing 13 and by means of an alignment lug (not illustrated here) of the two rolling bearing-side rings 126.

Figure 4:
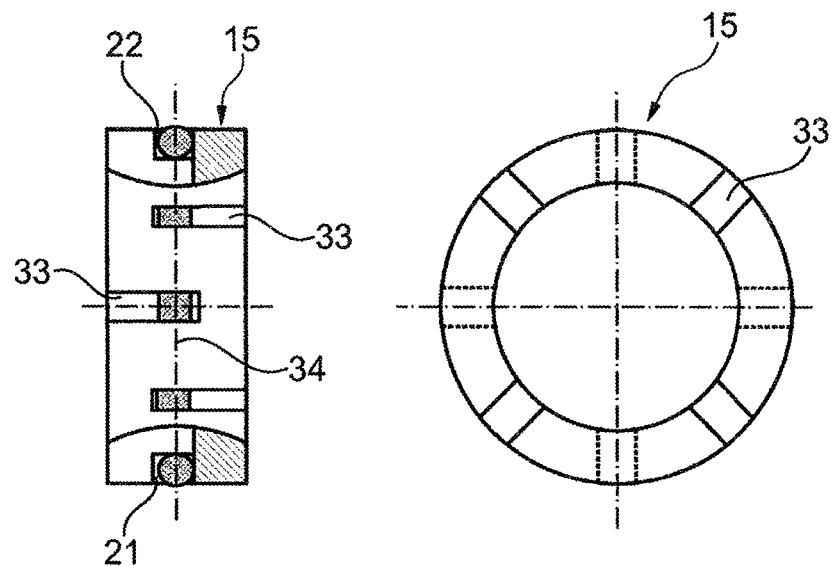
FIG. 4 is a partial side section view and associated front orthogonal projection view of an embodiment of a sleeve having a preload element, as disclosed herein.

The shaping of the sleeve 15 and the interaction of the sleeve 15 with the preload element 22 are illustrated in detail in FIG. 4.

The sleeve 15 has expansion slots 33 extending through it radially, which expansion slots are in each case arranged symmetrically with a 45° offset. The arrangement of the expansion slots 33 and of the preload element 22 is shown in the cross section of the sleeve 15. The expansion slots 33 are arranged offset on both sides and each extend beyond a central axis 34. This arrangement permits a radial expansion of the sleeve 15. Arranged centrally around the central axis 34, the elastomer preload element 22, which is in the form of a ring, lies in the recess 21. In this case, the radially acting elastomer preload element 22 preferably has an intensely progressive characteristic curve.

Figure 5:
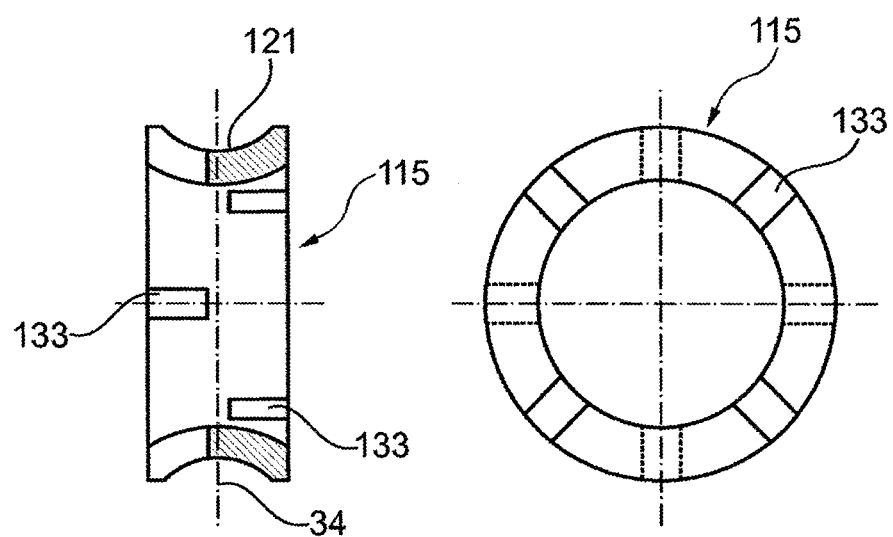
FIG. 5 is a partial side section view and associated front orthogonal projection view of an alternate embodiment of a sleeve having a preload element, as disclosed herein.

A further embodiment of a sleeve 115 is shown in FIG. 5. An elastomer preload element is not provided; instead, a recess 121 is of concave form rather than the rectangular form in the preceding example. Expansion slots 133 extend radially through the sleeve 115 and are arranged offset on both sides. The expansion slots 133 in this case do not extend beyond the central axis 34. The radial spring characteristic curve is in this case determined by way of the geometry of the recess 121.

Figure 6:
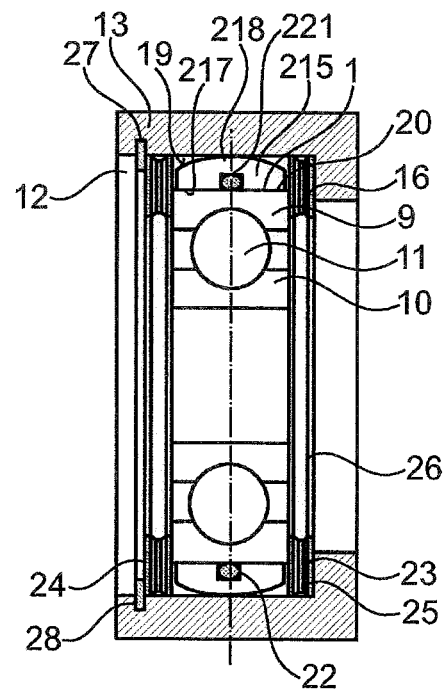
FIG. 6 is a side cross section view of yet another alternate embodiment of a bearing assembly of the present disclosure.
Figure 7:
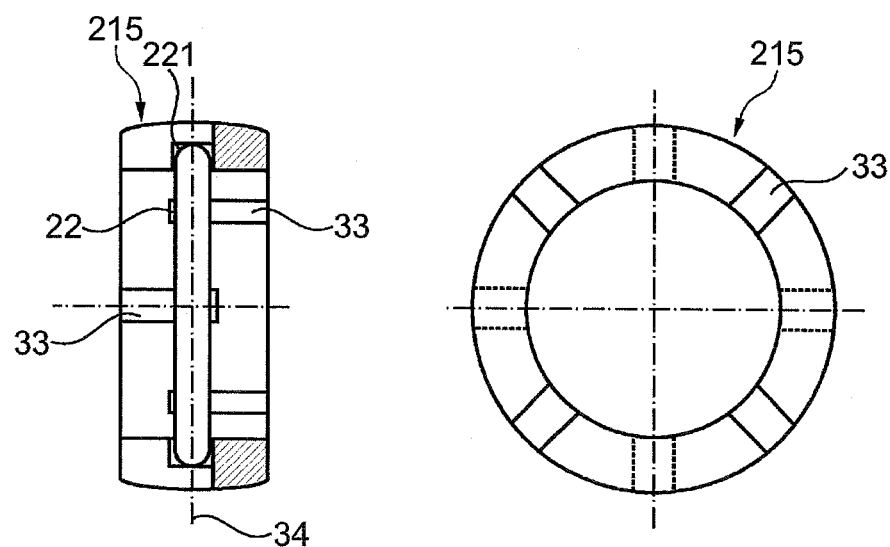
FIG. 7 is a partial side section view and associated front orthogonal projection view of the sleeve shown in the bearing assembly of FIG. 6

A further exemplary embodiment is shown in FIGS. 6 and 7. In this case, components identical to those already described in the preceding figures are denoted by the same reference numerals.

FIG. 6 shows, in section, a bearing arrangement according to the invention. The fixed bearing-side rolling bearing 1 which is shown here, and which is received in a housing opening 12 of a housing 13, has a bearing outer ring 9 and a bearing inner ring 10 and a multiplicity of rolling bodies 11. As in the preceding exemplary embodiments according to the invention, the housing opening 12 is of cylindrical form about an axis of rotation (not shown here) of a helical pinion, wherein the radius on the side close to the helical gear mechanism has been selected to be of such a magnitude that a sleeve 215 can be received between the bearing outer ring 9 of the rolling bearing 1 and the housing 13. Toward the drive input side, the radius of the housing opening 12 decreases, forming a housing shoulder 16. By contrast to the exemplary embodiments described above, an inner contact surface 217 of the received sleeve 215 is of cylindrical form, and an outer contact surface 218 of the sleeve 215 is of crowned form. The width of the sleeve 215 corresponds approximately to the width of the rolling bearing 1. The sleeve 215 bears by way of the outer contact surface 218 against a seat surface 19 of the housing 13 and by way of the inner contact surface 217 against an outer circumferential surface 20 of the bearing outer ring 9, wherein the contact between the crowned form of the sleeve 215 and the bearing 1 is linear. The cylindrical inner contact surface 217 has a rectangular recess 21 in which an annular elastomer preload element 22 is received. In this case, too, for the axial fastening of the bearing, axial spring elements 23, 24 are provided on the side close to the helical gear mechanism and on the side remote from the helical gear mechanism, between the bearing outer ring 9 and the housing shoulder 16. Said axial spring elements 23, 24 are composed of elastomers 25, which are each arranged between two rings 26 and which have been applied to said rings by vulcanization. The outer diameter of the rings 26 corresponds in this case, with a certain clearance, to the diameter of the housing opening 12. The inner axial spring element 23 bears against the housing shoulder 16, and the outer axial spring element 24 is held in its position by a securing ring 28 inserted into a groove 27 in the housing.

FIG. 7 shows the interaction of sleeve 215 with the preload element 22. The sleeve 215 has expansion slots 33 extending through it radially, which expansion slots are in each case arranged symmetrically with a 45° offset. The arrangement of the expansion slots 33 and of the preload element 22 is shown in the cross section of the sleeve 215. The expansion slots 33 are arranged offset on both sides and each extend beyond a central axis 34. This arrangement permits a radial expansion of the sleeve 215. Arranged centrally around the central axis 34, the elastomer preload element 22, which is in the form of a ring, lies in the inner recess 221.

In the case of an elastic preload of the helical pinion relative to the helical gear being implemented, the pivoting of the helical pinion results in a deviation between the central axes of the helical gear mechanism and rolling bearing. By virtue of the rolling bearing being received in angularly movable fashion, according to the invention, in a joint sleeve which is of crowned form at the inside or at the outside, said deviation is entirely or largely compensated. The pivoting acting on the rolling bearing, and the resulting moments, are greatly reduced in relation to a rigid arrangement which is not angularly movable. Known disadvantages such as increased or fluctuating friction, which impairs steering feel, generates noises and results in a reduced service life of the bearing arrangement, are eliminated or minimized. Furthermore, the bearing arrangement according to the invention permits the use of bearing types with minimized axial clearance and thus also tilting clearance, such as for example four-point bearings. This is achieved by virtue of the cylindrical bearing outer ring being received in angularly movable fashion in a sleeve which is of crowned form at the inside or at the outside. The bearing outer ring and the sleeve thereby form an angularly movable joint. For the compensation of the diameter tolerances of bearing outer ring, sleeve and housing opening, and of the effective diameter enlargement that arises owing to the oblique position of the bearing outer ring in the sleeve, the sleeve exhibits a certain amount of radial elasticity, which is however limited to the amount required for the compensation of said tolerances. Said sleeve is otherwise radially substantially rigid, and is advantageously formed as an injection-molded plastics part.

Furthermore, the tilting of the bearing relative to the housing opening requires a certain flexibility of the axial bearing fastening in the movement direction. For this purpose, the axial spring elements are provided on both sides of the bearing, which axial spring elements permit said tilting.

REFERENCE NUMERALS

1 Rolling bearing
2 Helical gear mechanism
3 Helical pinion
4 Helical gear
5 Floating bearing
6 Preload device
7 Compression spring
8 Toothing
9 Bearing outer ring
10 Bearing inner ring
11 Rolling bodies
12 Housing opening
13 Housing
14 Axis of rotation
15 Sleeve
16 Housing shoulder
17 Inner contact surface
18 Outer contact surface
19 Seat surface
20 Outer circumferential surface
21 Recess
22 Preload element
23 Axial spring element
24 Axial spring element
25 Elastomer
26 Rings
27 Groove
28 Securing ring
29 Pivot axis
30 Axis of rotation
31 Protuberance
32 Groove
33 Expansion slots
34 Central axis
115 Sleeve
121 Recess
123 Axial spring element
124 Axial spring element
126 Rings
134 Expansion slots
215 Sleeve
217 Inner contact surface
218 Outer contact surface
221 Recess

The invention claimed is:

1. A helical gear mechanism for a steering system of a motor vehicle, comprising:
   a bearing housing having a seat surface defined therein;
   a sleeve disposed in said bearing housing and having an inner contact surface, and an outer contact surface in contact with said seat surface of said bearing housing;
   a fixed bearing having a bearing inner ring, and a bearing outer ring defining an outer circumferential surface, said fixed bearing being disposed in said sleeve within said bearing housing and said inner contact surface of said sleeve being in contact with said outer circumferential surface of said bearing outer ring;
   a helical pinion having a longitudinal axis, and a bearing seat defined at a drive input side of said pinion that is fixedly disposed within said inner ring of said fixed bearing so as to mount said pinion to said fixed bearing such that said pinion is rotatable about said longitudinal axis, said helical pinion together with said fixed bearing being pivotable relative to said housing about a pivot axis oriented perpendicular to said longitudinal axis; and
   a helical gear having a helical gear toothing operatively engaged with said helical pinion,
   wherein one of said inner or outer contact surfaces of said sleeve is convex shaped and configured to make circumferential contact, on a central plane of said fixed bearing, with said respective outer circumferential surface of said bearing outer ring or said seat surface of said bearing housing, and wherein the other of said inner or outer contact surfaces of said sleeve is cylindrical, said cylindrical surface having a central circumferential recess defined therein.

2. The helical gear mechanism of claim 1, wherein said sleeve is elastic.

3. The helical gear mechanism of claim 1, wherein said pivot axis extends centrally through said fixed bearing.

4. The helical gear mechanism of claim 1, further comprising:
   a drive motor operatively coupled to said pinion at said fixed bearing by an elastic coupling disposed therebetween.

5. The helical gear mechanism of claim 1, wherein said sleeve defines a plurality of expansion slots extending radially there through.

6. The helical gear mechanism of claim 5, wherein said expansion slots are alternatingly disposed on each of a front side and a back side of said sleeve through said inner and outer surfaces thereof, and extend in an axial direction beyond a central plane of said sleeve, which central plane is perpendicular to the sleeve's axial direction.

7. The helical gear mechanism of claim 5, wherein said central recess of said sleeve is concave, and wherein said expansion slots are alternatingly disposed on each of a front side and a back side of said sleeve through said inner and outer surfaces thereof.

8. The helical gear mechanism of claim 1, wherein said sleeve includes an annular preload element disposed within said central recess.

9. The helical gear mechanism of claim 1, further comprising at least one axial spring element having a ring disposed adjacent either of a front or back side of said fixed bearing and configured to bias said bearing in an axial direction.

10. The helical gear mechanism of claim 9, wherein said ring of said at least one axial spring element has at least one convex protuberance defined therein, the center of which protuberance defines an axis of rotation that coincides with the pivot axis of said helical pinion.

11. The helical gear mechanism of claim 10, wherein said ring of said at least one axial spring element has an alignment lug protruding therefrom, and wherein said housing further defines, on an inner side thereof, a groove into which engages said alignment lug of said axial spring element, said alignment lug configured to align said convex protuberance on said ring of said axial spring element within said housing.

12. A helical gear mechanism for a steering system of a motor vehicle, comprising:
   a bearing housing having a seat surface defined therein;
   a sleeve disposed in said bearing housing and having an inner contact surface, and an outer contact surface in contact with said seat surface of said bearing housing;
   a fixed bearing having a bearing inner ring, and a bearing outer ring defining an outer circumferential surface, said fixed bearing being disposed in said sleeve within said bearing housing and said inner contact surface of said sleeve being in contact with said outer circumferential surface of said bearing outer ring, wherein one of said inner or outer contact surfaces of said sleeve is convex shaped and configured to make circumferential contact, on a central plane of said fixed bearing, with said respective outer circumferential surface of said bearing outer ring or said seat surface of said bearing housing;

a helical pinion having a longitudinal axis, and a bearing seat defined at a drive input side of said pinion that is fixedly disposed within said inner ring of said fixed bearing so as to mount said pinion to said fixed bearing such that said pinion is rotatable about said longitudinal axis, said helical pinion together with said fixed bearing being pivotable relative to said housing about a pivot axis oriented perpendicular to said longitudinal axis;

a helical gear having a helical gear toothing operatively engaged with said helical pinion; and at least one axial spring element having a ring disposed adjacent either of a front or a back side of said fixed bearing and configured to bias said bearing in an axial direction, wherein said ring has at least one convex protuberance defined therein, the center of which protuberance defines an axis of rotation that coincides with the pivot axis of said helical pinion.

13. The helical gear mechanism of claim 12, wherein said ring of said at least one axial spring element has an alignment lug protruding therefrom, and wherein said bearing housing further defines, on an inner side thereof, a groove into which engages said alignment lug of said axial spring element, said alignment lug configured to align said convex protuberance on said ring of said axial spring element within said housing.

14. The helical gear mechanism of claim 12, wherein said sleeve is elastic.

15. The helical gear mechanism of claim 12, wherein said pivot axis extends centrally through said fixed bearing.

16. The helical gear mechanism of claim 12, further comprising:

a drive motor operatively coupled to said pinion at said fixed bearing by an elastic coupling disposed therebetween.

17. The helical gear mechanism of claim 12, wherein said sleeve defines a plurality of expansion slots extending radially there through.

18. The helical gear mechanism of claim 17, wherein said expansion slots are alternatingly disposed on each of a front side and a back side of said sleeve through said inner and outer surfaces thereof, and extend in an axial direction beyond a central plane of said sleeve, which central plane is perpendicular to the sleeve's axial direction.

19. The helical gear mechanism of claim 17, wherein said central recess of said sleeve is concave, and wherein said expansion slots are alternatingly disposed on each of a front side and a back side of said sleeve through said inner and outer surfaces thereof.

20. The helical gear mechanism of claim 12, wherein said sleeve includes an annular preload element disposed within said central recess.

* * * * *